United States Patent Office 3,717,627
Patented Feb. 20, 1973

3,717,627
PROCESS FOR THE PRODUCTION OF ESTRO-GENIC STEROIDS HAVING A FORMYL GROUP IN THE 1- OR 4-POSITION
Stuart Bruce Laing, Greenford, England, and Peter Job Sykes, Edinburgh, Scotland, assignors to Glaxo Laboratories Limited, Greenford, England
No Drawing. Filed May 19, 1969, Ser. No. 825,999
Claims priority, application Great Britain, May 24, 1968, 25,005/68
Int. Cl. C07c 173/00, 169/08
U.S. Cl. 260—239.55                12 Claims

ABSTRACT OF THE DISCLOSURE

This invention relates to a process for the production of aromatic steroids carrying a formyl group, more especially a formyl group in the 1- or 4-position.

We have found that steroids having an aromatic ring A and substituted in ring A by both a methyl group and an ether group can be oxidised by a 1-electron transfer oxidising agent such as a ceric or argentic compound, to convert the aromatic methyl group into a formyl group. The formyl group may subsequently be decarbonylated to yield the corresponding nor steroid or caused to undergo other aldehyde reactions whereby useful groupings can be introduced. Our new method is thus of general use in the synthesis of aromatic steroids, many of which have been found to exhibit useful physiological activity, as is particularly the case, for example, in the oestrane series.

Our new method is of particular use in the production of 19-nor steroids, which in recent years have been widely investigated for their progestational and oestrogenic activity. Aromatic 19-nor steroids have been prepared from 10-methyl-1,4-dien-3-ones and from 10-methyl-1,4,6-trien-3-ones by dienone-phenol rearrangement but the methyl group which is moved from the 10-position in the reaction has always been found to migrate, for example either to the 1-position or to the 4-position.

The dienone-phenol rearrangement is normally effected under acid conditions in the presence of an esterifying or etherifying reagent such as acetic anhydride or ethyl orthoformate. Under such conditions the 3-oxygen function is converted to an ether or ester group, which may however, appear at the 1-position. Thus for example, cholesta-1,4-dien-3-one yields, with acetic anhydride in acid medium, 1 - acetoxy - 4 - methyl-19-nor-cholesta-1,3,5(10)-triene while under the same conditions androsta - 1,4,6 - triene - 3,17-dione yields 3-acetoxy-1-methyloestra-1,3,5(10),6-tetraen-17-one.

Where an ester group is initially formed in the A-ring, it will be necessary to convert this to an ether group, for example by hydrolysis and reaction with an etherifying agent such as a reactive ester of an appropriate alcohol, e.g. an alkyl halide, sulphate or hydrocarbon sulphonate. On the other hand, the ether group may, as indicated above, be introduced directly in the dienone-phenol rearrangement for example cholesta - 1,4 - dien - 3-one with ethyl orthoformate and sulphuric acid in methanol gives 1 - methoxy - 4 - methyl - 19 - norcholesta - 1,3,5(10)-triene admixed with the corresponding 3 - methoxy-1-methyl compound; use of ethanol yields the ethoxy compounds. (J. Elks, J. F. Oughton and L. Stephenson, J.C.S. 1961, 4531–4534).

Methyl groups in the A-ring are not usual in the known physiologically active steroids however, and methods for their removal are therefore desirable.

The ring-A ether substituent may be, for example, an alkoxy, aralkoxy or aryloxy group e.g. a methoxy, ethoxy, benzyloxy or phenoxy group which in general will be at the 1- or 3-positions of the steroid molecule. Alkoxy groups are preferred.

According to one feautre of the present invention there is provided a process for the preparation of steroids having an aromatic ring-A and substituted in ring-A by both an ether group and a formyl group in which a steroid having an aromatic ring-A and substituted in ring-A by both a methyl group and an ether substituent is oxidised with a 1-electron transfer oxidising agent.

The method according to the present invention, whereby an aromatic methyl group is oxidised to a formyl group which may then be decarbonylated, thus affords a useful means whereby a wide range of known physiologically active 19- nor steroids can be prepared. The aromatic steroids initially produced can, if desired, be converted to the corresponding non-aromatic steroids, for example by Birch reduction using alkali metal/ammonia and/or amine reducing agents.

The conversion of the aromatic methyl group to formyl can be effected by ceric salts, especially readily water soluble salts such as ceric ammonium salts, e.g. ceric ammonium nitrate or ceric perchlorate, or argentic salts, for example argentic picolinate or argentic oxide. Other 1-electron transfer oxidising agents of about the same order of oxidation potential as the ceric and argentic salts or greater may also advantgeously be used. The ceric oxidation is preferably effected under acidic conditions, e.g. in an aqueous solution of an inorganic or organic acid, for example an aliphatic acid such as acetic or propionic acid or phosphoric, nitric, or sulphuric acid or in a cyclic ether solvent such as dioxan or a nitrile solvent such as acetonitrile; the ceric salt itself will normally render the medium acidic. The argentic oxidation may advantageously be effected under acidic or basic conditions.

The reaction time may be adjusted so that further oxidation of the formyl group to a carboxy group is minimised and may, for example, be of the order of 10 hours. The reaction may be conveniently effected at an elevated temperature which may be for example from 40 to 100° C. The reaction is, however, preferably conducted at room temperature.

The oxidation can readily be effected selectively to avoid oxidation of other groups within the steroid molecule. It is noteworthy that steroid 1,3,5(10)-trienes which are unsubstituted at the 6-position are not converted to 6-oxo-steroids although the 6-carbon atom is in the same relationship to the aromatic ring as the 1- or 4-methyl group. Furthermore, ether and ester groups remain unaffected under the oxidation conditions normally used as do activated or unactivated endocyclic methylene groups e.g. at C–6 or C–16.

Any hydroxyl groups present in the steroid may, if necessary, be protected before the oxidation, for example by conversion to ethers or esters e.g. lower alkyl ethers such as methyl or ethyl ethers, or lower alkanoyl esters such as acetates or propionates. Such hydroxyl groups may, for example, be at positions 6-, 11-, 12-, 16- or 17- or may be a substituent in a C–17 alkyl side chain.

By the term "steroid" as used herein we mean compounds which have the cyclopentaneperhydrophenanthrene structure and which may carry various substituents on the ring structure as indicated in more detail below.

The steroid molecule may be substituted at various positions and the process according to the invention may be applied to steroids containing a wide variety of substituents.

Position 6- may be unsubstituted or substituted, for example, by an alkyl group, in particular a methyl group, or a halogen atom.

The 9-position may, for example, carry a halogen atom, but is preferably unsubstituted.

The 13-position may be unsubstituted but will more commonly carry an alkyl group such as the methyl group present in the androstanes and pregnanes.

The 11- and 12-positions may be unsubstituted or may be substituted, for example, by acyloxy or ether groups or halogen atoms. Hydroxyl groups at these positions may be protected e.g. by esterification or etherification and oxo groups may also be protected, for example by reduction to hydroxyl followed by protection or by conversion to a ketal. Any halogen atoms which are present are preferably fluorine, chlorine or bromine atoms.

The 16-position may be unsubstituted or may for example, carry an alkyl substituent, e.g. a methyl or ethyl group, an exocyclic methylene group or an ether or ester group.

The substituents present at position 17- may be any of those normally encountered in steroid chemistry; they may for example be hydroxyl or keto groups free or suitably protected, e.g. as esters of a hydroxyl group for example acetates or propionates; acyl groups, e.g. acetyl or acetoxyacetyl groups; alkyl, alkenyl or alkynyl groups for example, methyl, prop-2-enyl, 2-methylprop-2-enyl, 1-methylprop-2-enyl, but-2-enyl, ethynyl or chloroethynyl groups or the 16,17-side chains of the sapogenins, e.g. of diosgenin or hecogenin, or of steroidal alkaloids, e.g. of solasodine.

Olefinic double bonds may be present within the steroid molecule although care should be exercised with $\Delta^6$ compounds which are preferably reduced prior to the oxidation reaction. Thus, for example, when a 1,4,6-trien-3-one is subjected to dienone-phenol rearrangement, in acetic anhydride and sulphuric acid, the product is a 1-methyl-3-acetoxy-1,3,5(10),6-tetraene and the 6-double bond is then preferably reduced, e.g. by hydrogenation over a catalyst such as palladium advantageously after hydrolysis of the 3-acetoxy group and etherification to form a 3-ether.

According to a further feature of the present invention there is provided a process for the decarbonylation of a steroid having an aromatic ring A and substituted in ring A by a formyl group wherein said aromatic formyl steriod is contacted with a noble metal decarbonylating agent.

Suitable reagents for effecting the decarbonylation of the formyl groups when formed are noble metal decarbonylating agents such as metallic palladium or a rhodium decarbonylating agent e.g. a tris-(triphenylphosphine)-rhodium salt for example with chloride. The reagent is preferably used in substantially stoichiometric quantities.

The decarbonylation reaction may be effected in a suitable solvent for example a hydrocarbon e.g. benzene toluene, xylene, etc. or a nitrile e.g. benzonitrile, acetonitrile etc., advantageously at ambient temperature or at an elevated temperature, for example, the boiling point of the solvent e.g. 40°–100° C.

The formyl compound is preferably not purified before the decarbonylation process.

The decarbonylated product may be purified by the conventional methods such as chromatography on alumina which removes the decarbonylating agent or its carbonylated derivatives e.g. bis(triphenylphosphine)-rhodium chlorocarbonyl.

The formyl compounds described in the foregoing may be oxidised, if desired, to the corresponding carboxyl compounds e.g. using conventional reagents for oxidation of aldehydes, for example potassium permanganate etc. It is interesting to note that the carboxyl compounds so formed might have been expected readily to decarboxylate, thus according a further way of replacing the formyl group by hydrogen, but in fact such decarboxylation could not be effected under conventional conditions.

Steroid 1,3,5(10)-trienes having an ether group in the A-ring and having a formyl or carboxyl group in the 1- or 4-position, the formyl group being other than in the 4-position when the ether group is in the 3-position are new compounds and constitute a yet further feature of the present invention. Both types of compound may serve usefully as intermediates in the preparation of related products by conversion of the formyl or carboxyl groups into derivatives thereof.

The following examples serve to illustrate the invention without limiting it; all temperatures are in ° C.:

EXAMPLE 1

1 - methoxy - 4-methyl-19-nor-cholesta-1,3,5(10)-triene was prepared according to the literature preparations:

(i) A. L. Wilds and C. Djerassi, J. Amer. Chem. Soc., 68 1712, (1946).

(ii) C. Djerassi, G. Rosenkranz, J. Romo, J. Pataki and St. Kaufmann, J. Amer. Chem. Soc., 1950, 72, 4540

(a) 4-formyl-1-methoxy-19-nor - cholesta - 1,3,5(10)-triene.—1-methoxy-4-methyl-19-nor-cholesta - 1,3,5(10)-triene (1.0 g.) was dissolved in acetic acid (100 ml.) and a solution of ceric ammonium nitrate (5.4 g.) in acetic acid (20 ml.) and water (20 ml.) was added slowly over 2 hrs. The solution was stirred at room temperature for 16 hrs., poured into water, and the steroids extracted with ether. The ethereal solution was washed with sodium carbonate, then water and dried ($MgSO_4$). Evaporation of the solvent gave a pale yellow glass (0.93 g.) which would not crystallise. The product was chromatographed on alumina to give a white solid eluted with benzene (0.11 g.). The steroid was not crystallised but was identified as the desired product by spectra $\nu_{max}$. 2,700 (aldehyde), 1695 (aldehyde carbonyl), 1630 (aromatic C=C), 1230 (ether), 1080 and 805 cm.$^{-1}$ (aromatic H); N.M.R. $\tau$ —0.03 (aldehyde H), 2.32–3.34 (aromatic H), 6.17 (methoxyl), 9.09, 9.18 and 9.28 (methyls).

(b) 1-methoxy-19-nor-cholesta-1,3,5(10) - triene.—The aldehyde prepared above (0.05 g.) in benzene (10 ml.) was treated with tris-(triphenylphosphine)-rhodium chloride (0.15 g.) and the solution was refluxed for 1 hr. The solution was cooled and filtered through alumina, elution with benzene being continued. Evaporation of the solvent gave a clear glass (0.012 g.) which could not be crystallised, but was shown to be the desired 19-nor steroid by its spectra $\nu_{max}$. 1630 (aromatic C=C), 1260 (ether), 830 and 740 cm.$^{-1}$ (1:2:3 trisubstituted benzene ring N.M.R. $\tau$ 6.20 (methoxyl), 9.09, 9.18 and 9.27 (methyls). The aromatic hydrogens could only be seen as a rise in the base line and could not be integrated, due to lack of material.

EXAMPLE 2

(a) 3-methoxy-1-methyloestra-1,3,5(10)-,6-tetraen - 17-one.—Androsta-1,4,6-trien-3,17-dione (3.1 g.) in acetic anhydride (100 ml.) was treated with sulphuric acid (0.1 ml.) in acetic anhydride (10 ml.), and was set aside for 10 hours at room temperature. The solution was poured into potassium hydroxide solution (40%; 100 ml.) and ice. The steroid was extracted into dichloromethane and the solution was washed with water, dried ($MgSO_4$) and the solvent evaporated. The crude product (2.7 g.) was dissolved in methanol (100 ml.) and potassium hyroxide (4.5 g.) was added. The solution was refluxed for 1 hour, poured into water and the methanol distilled off. The steroid was extracted into dichloromethane and the solution was washed with water, dried ($MgSO_4$) and the solvent eavporated. This crude product in methanol (20 ml.) was stirred at 90° with potassium hydroxide solution (15%; 30 ml.) and methyl toluene-p-sulphonate (4 g.) for 4 hours. Water was then added, the steroid extracted with dichloromethane and this solution was washed with dilute acid, then water and dried ($MgSO_4$) and the solvent evaporated. The crude reaction product was chromatographed on deactivated alumina. Elution with benzene gave 3-methoxy-1-methyloestra-1,3,5(10),6-tetraen-17-one (0.54 g.) M.P. 151.5–152°, (from methanol); $\nu_{max}$. 1735, 1320, 1080, 890, 870 and 700 cm.$^{-1}$ $^1$H N.M.R. 9.07 (C–18 methyl), 7.47 (1-methyl), 6.23 (methoxyl) 3.75, quartet, J=9 c.p.s. (6- and 7-olefinic protons) and 3.48, singlet (2- and 4-aromatic protons). (Found (percent): C, 80.9; H, 8.2. $C_{20}H_{24}O_2$ requires (percent): C, 81.0; H, 8.2).

Elution with benzene-ether (98:2) gave starting material (1.22 g.).

(b) 3-methoxy-1-methyloestra-1,3,5(10) - trien - 17-one.—3-methoxy-1-methyloestra-1,3,5(10), 6-tetraen-17-one (0.3 g.) was dissolved in ethanol (20 ml.) and hydrogenated at one atmosphere pressure over 10% palladium on charcoal catalyst; 1 mole of hydrogen being taken up within 10 min. The catalyst was filtered off and the solvent removed. Crystallisation from ethanol gave 3-methoxy-1-methyloestra-1,3,5(10)-trien - 17 - one. M.P. 128–130°.

(c) Cerium$^{IV}$ oxidation of 3-methoxy-1-methyloestra-1,3,5(10)triene-17-one.—3-methoxy-1-methyl - 1 - methyl-oestra-1,3,5(10)trien-17-one (210 mg.) in acetic acid (10 ml.) was treated with ceric ammonium nitrate (1.58 g.) in 90% acetic acid (10 ml.) over 30 min., the solution being stirred at room temperature. Stirring was continued for a further hour and a sample of the reaction mixture (4 ml.) was then removed, poured into water and the steroid extracted into ether. The ethereal solution was washed with aqueous sodium carbonate, water and then dried ($MgSO_4$) and the solvent evaporated off. Infrared and $^1H$ N.M.R. spectra showed that this sample consisted largely of unchanged starting material, although the signal at $\tau$ 7.85 (aromatic methyl group) had slightly diminished. After 4.5 hrs. a second sample (4.0 ml.) was taken from the reaction and the steroid isolated as described above. Spectra showed some starting material still present (ca. 40%), but an aldehyde was also present. (ca. 60%, judged from the N.M.R. integrated signals) $^1H$ N.M.R. peaks at 9.08 (C–18 methyl), 7.85 (C–1 methyl), 6.18 (methoxyl) and −0.03 (C–1 formyl proton). A third sample of the reaction product was removed after 10 hours and the steroid again isolated. No starting material was present and this fraction was shown to be 1-formyl-3-methoxy-oestra-1,3,5(10)-trien-17-one $\nu_{max.}$ 2700, 1700, 1630, 1245 and 820 cm.$^{-1}$; $^1H$ N.M.R. peaks at $\tau$ 9.10 (C–18 methyl), 6.18 (methoxyl) and −0.03 (C–1 formyl proton). After a total reaction time of 22 hours the remainder of the reaction product was worked up as above and spectra of this material indicated that it contained an aldehyde and an acid in approximately equal amounts. $\nu_{max.}$ 3400 (broad band), 2700, 1735, 1700, 1630, 1250 and 815 cm.$^{-1}$ $^1H$ N.M.R. absorptions at $\tau$ 9.10 (C–18 methyl), 6.18 (methoxyl) and −0.03 (integrating for approximately half C–1 formyl proton). (The N.M.R. spectra of all the above materials showed a complex multiplet between 2.3 and 3.4 from the C–2 and C–4 aromatic protons.)

(d) 3-methoxyoestra-1,3,5(10) - trien - 17 - one.—1-formyl-3-methoxyoestra-1,3,5(10)-trien-17-one (20 mg.) and tris-(triphenylphosphine)-rhodium chloride (60 mg.) in benzene (5 ml.) were refluxed for 2 hours. The solution was then cooled and adsorbed on to alumina (Grade II). Elution with benzene-ether (1:1) gave 3-methoxy-oestra-1,3,5(10)-trien-17-one (15 mg.) whose M.P., I.R. and $^1H$ N.M.R. spectra were all identical to an authentic sample of oestrone methyl ether.

EXAMPLE 3

(a) 17β-acetoxy-3-methoxy-1-methyloestra-1,3,5(10),-6-tetraene.—17β - acetoxyandrosta-1,4,6-trien-3-one (5.7 g.) in acetic anhydride (150 ml.) was treated with concentrated sulphuric acid (1.5 ml.) in acetic anhydride (20 ml.) and was set aside for 3 hr. More concentrated sulphuric acid (1.0 ml.) in acetic anhydride (10 ml.) was added and after a further hour the solution was poured into potassium hydroxide solution (40%, 200 ml.) and ice. The steroid was extracted into dichloromethane and this solution was washed with water and dried ($MgSO_4$) and the solvent evaporated. The crude product, in methanol (100 ml.), was refluxed for 1 hour with potassium hydroxide solution (45%; 25 ml.), water was then added and the steroid again extracted into dichloromethane. This solution was well washed with water, dried ($MgSO_4$) and the solvent evaporated. The crude phenol (5.2 g.) was dissolved in methanol (30 ml.) and this was added to methyl toluene-p-sulphonate (6 g.) in aqueous potassium hydroxide (15%; 150 ml.) and the suspension was stirred at 90° for 3 hr. The steroid was then extracted with dichloromethane and the solution was washed with dilute acid and water and was dried ($MgSO_4$) and evaporated to dryness. The crude product was dissolved in pyridine (30 ml.) and acetic anhydride (30 ml.). After standing at room temperature for 26 hr. this solution was poured on to ice and the steroid was extracted into ether. The ether solution was washed with water, dilute acid and aqueous sodium bicarbonate, dried ($MgSO_4$) and evaporated to dryness. The product was crystallised from acetone-methanol to give 17β-acetoxy-3-methoxy-1-methyloestra-1,3,5(10),6-tetraene (3.6 g.), M.P. 128–133°, $\nu_{max.}$ 1740, 1630, 1265, 1245, 1085 and 830 cm.$^{-1}$, $^1H$ N.M.R. absorptions at $\tau$ 9.16 (C–18 methyl), 7.98 (C–17 acetate), 7.51 (C–1 methyl), 6.28 (methoxyl), 3.77 and 4.10, quartet J=8 c.p.s. (H–6 and H–7) and 3.52 singlet (H–2 and H–4). (Found (percent): C, 74.4; H, 8.5. $C_{22}H_{28}O_3$, $CH_4O$ requires (percent): C, 74.2; H, 8.7).

(b) 17β - acetoxy-3-methoxy-1-methyloestra-1,3,5(10)-triene.—17β - acetoxy - 3 - methoxy-1-methyloestra-1,3,5(10),6-tetraene (3.0 g.) in ethanol (40 ml.) was hydrogenated at room temperature over a 10% palladium on charcoal catalyst. The catalyst was filtered off and the solvent was evaporated. Crystallisation from methanol gave 17β - acetoxy-3-methoxy-1-methyloestra-1,3,5(10)-triene (2.8 g.), M.P. 159–161°, $\nu_{max.}$ 1735, 1245, 1140, 1050, 1030 and 820 cm.$^{-1}$, $^1H$ N.M.R. absorptions at $\tau$ 9.16 (C–18 methyl), 7.96, (C–17 acetate), 7.48 (C–1 methyl), 6.34 (methoxyl) and 3.52, singlet (H–2 and H–4). (Found (percent): C, 77.0; H, 8.9. $M_{22}H_2O_2$ requires (percent): C, 77.2; H, 8.8).

(c) 17β - acetoxy-1-formyl-3-methoxyoestra-1,3,5(10)-triene.—17β-acetoxy - 3 - methoxy-1-methyloestra-1,3,5 (10)-triene (2.6 g.) in acetic acid (100 ml.) was treated over 1 hour with ceric ammonium nitrate (20 g.) in acetic acid (10 ml.) and water (15 ml.) with vigorous stirring. The stirring was continued, at room temperature, for 10 hr. and the solution was then poured into water and the steroid extracted with ether. The ether solution was washed with water, dried ($MgSO_4$) and evaporated at room temperature to give the aldehyde (1.8 g.) which did not crystallise. The aldehyde showed only one spot during thin layer chromatography, using light petroleum-ether 2:1 as solvent. $\nu_{max.}$ 2700, 1740, 1700, 1635, 1240, 1135 and 820 cm.$^{-1}$, $^1H$ N.M.R. absorptions at $\tau$ 9.18 (C–18 methyl), 7.96 (C–17 acetate), 6.29 (methoxyl), 3.16, singlet (H–2 and H–4) and −0.04 (1 formyl proton).

(d) 17β - acetoxy-3-methoxyoestra-1,3,5(10)-triene.— The aldehyde from (c) above (0.7 g.), dissolved in dry benzene (100 ml.) was treated with tris-(triphenylphosphine)-rhodium chloride (2.1 g.) and the solution was refluxed for 1 hr. The volume of benzene was reduced to 20 ml. and the solution was adsorbed onto alumina. Elution with benzene gave a pale yellow oil which was crystallised from ethanol to give 17β-acetoxy-3-methoxy-oestra-1,3,5(10)-triene (0.47 g.) M.P. 101–103°. The material had identical I.R. and N.M.R. spectra to those of an authentic sample of oestradiol methyl ether 17β-acetate. The 17β-acetate group was removed by alkali saponification to give oestradiol methyl ether M.P. 120–121°.

EXAMPLE 4

(a) 3-methoxy - 1 - methyl-19-nor-cholesta-1,3,5(10)-triene.—3-methoxy - 1 - methyl - 19 - nor-cholestra-1,3,5 (10),6-tetraene (1.04 g.), dissolved in ethanol (15 ml.), was hydrogenated over a 10% palladium on charcoal catalyst. After 30 min. hydrogen uptake had ceased and the catalyst was filtered off and the solvent removed.

Crystallisation of the product from acetone gave 3-methoxy-1-methyl-19-nor-cholesta-1,3,5(10)-triene (0.93 g.), M.P. 75–77°, $[\alpha]_D$ −93° (c. 0.1; CHCl$_3$). $\gamma_{max.}$ 1620, 1305, 1150, 1070 and 865 cm.$^{-1}$; $^1$H N.M.R. absorptions at $\tau$ 9.26 (C–18 methyl), 9.17, 9.08 (side chain methyl groups), 7.69 (C–1 methyl), 6.26 (methoxy) and 3.48 singlet (H–2 and H–4) (Found (percent): C, 84.5; H, 11.2. C$_{28}$H$_{44}$O requires (percent): C, 84.8; H, 11.2).

(b) 1 - formyl - 3 - methoxy-19-nor-cholesta-1,3,5(10)-triene.—3 - methoxy-1-methyl-19-nor-cholesta-1,3,5(10)-triene (0.70 g.) in acetic acid (100 ml.) was treated dropwise with stirring over 3 hr. at room temperature with a solution of ceric ammonium nitrate (4.08 g.) in water (2 ml.) and acetic acid (10 ml.). Stirring was continued for 10 hr. and the solution was then poured into water and the steroid extracted with ether. The ether solution was washed with sodium carbonate solution and water, dried (MgSO$_4$) and the ether evaporated to give a light brown glass which was chromatographed on alumina. Elution with benzene gave a clear glass which was identified as the aldehyde from its spectra. The material (0.55 g.) did not solidify, and no attempt was made to crystallise it. $\nu_{max}$. 2700, 1710, 1630, 1285, 1110, 865 and 680 cm.$^{-1}$, $^1$H N.M.R. peaks at $\tau$ 9.30 (C–18 methyl), 9.18, 9.09 (side chain methyls), 6.19 (methoxyl), 3.50, singlet (H–2 and H–4) and −0.05 (1 formyl proton.)

(c) 3-methoxy - 19 - nor - cholesta-1,3,5(10)-triene.—1-formyl-3-methoxy - 19 - nor-cholesta-1,3,5(10)-triene (200 mg.) and tris-(triphenylphosphine)-rhodium chloride (686 mg.) in benzene (35 ml.) were refluxed together for 1.5 hr. The benzene was then removed and the solid residue was extracted several times with light petroleum, this solution was then concentrated and adsorbed on to alumina, (Grade II). Elution with benzene-ether (9:1) gave a pale brown solid crystallised from methanol to give 3-methoxy-19-nor-cholesta - 1,3,5(10) - triene (125 mg.), M.P. 89–91°, $[\alpha]_D$ +60° (c. 0.12; CHCl$_3$); $^1$H N.M.R. peaks at 9.19 (C–18 methyl), 9.10 (side chain methyls), 6.16 (methoxyl) and 3.05 to 3.45 unresolved multiplet (H–1, H–2 and H–4). Found (percent): C, 84.75; H, 11.3. C$_{27}$H$_{42}$O requires (percent): C, 84.75; H, 11.1).

EXAMPLE 5

1-methoxy-19-nor-cholesta-1,3,5(10)-triene-4-carboxylic acid

The crude glassy product from Example 1(a) (0.56 g.) was dissolved in acetone (40 ml.) containing 5% water, and treated with potassium permanganate (0.1 g.). The resulting solution was stirred at room temperature for 5 hr., then was poured into water. Sodium bisulphite was added and the steroids were extracted into ether. The ethereal solution was washed with dilute acid, then water, dried (MgSO$_4$) and evaporated. Crystallisation from acetone gave the acid (0.28 g.) M.P. 143–147°, $\nu_{max}$. 3400 (Broad band, acid), 1700 (acid), 1260 (ether), 1090, 830 (aromatic H). N.M.R. $\tau$ 2.43–3.30 (complex multiplet, two aromatic H), 6.18 (methoxyl), 9.10, 9.20, 9.31 (methyls).

EXAMPLE 6

Conversion of 1-methyl-3-methoxy-17$\beta$-acetyloestrane into 3-methoxy-17$\beta$-acetyloestrane (a) 1 - formyl-3-methoxy-17$\beta$-acetyloestra-1,3,5(10)-triene.—1-methyl-3-methoxy-17$\beta$-acetyloestra - 1,3,5(10)-triene (300 mg.) in acetic acid (10 ml.) was treated with at about 20° C. ceric ammonium nitrate (2 g.) in aqueous acetic acid (15 ml.) over 30 min. The solution was homogeneous and was not stirred. After 10 hours the solution was poured into water and the steroids were extracted with ether. The ether solution was washed with aqueous sodium bicarbonate and then with water, it was dried (MgSO$_4$) and evaporated at room temperature to give 1-formyl - 3 - methoxy-17$\beta$-acetyloestra - 1,3,5(10) - triene $\nu_{max}$. 2700, 1700–1710 (aldehyde and 20-carbonyl group); N.M.R. $\tau$ 9.31 (C–18 methyl) 6.16 (3-methoxyl), 7.88 (C–21 methyl) and −0.01 (1-formyl H). The crude aldehyde was rapidly filtered through a short column of Florisil using benzene as the eluting solvent prior to its decarbonylation. The weight of aldehyde obtained was 120 mg.

The starting material was prepared from progesterone by the method of Djerasse (J. Amer. Chem. Soc., 1951, 73, 1523).

(b) 3 - methoxy-17$\beta$-acetyloestra-1,3,5(10)-triene.—1-formyl-3-methoxy - 17$\beta$ - acetyloestra - 1,3,5(10) - triene (120 mg.), dissolved in dry benzene (50 ml.) was treated with tris-(triphenylphosphine)-radium chloride (0.4 g.) and the solution was refluxed for 1 hour. The volume of the benzene was then reduced to 5 ml. and the solution was aborbed on to alumina. Elution with benzene gave an oil which crystallised from acetone-light petroleum to give 3-methoxy-17$\beta$-acetyloestra - 1,3,5(10) - triene, (45 mg.) M.P. 134–136°. $[\alpha]_D$ +165° (c. 0.1; CHCl$_3$) N.M.R. $\tau$ 9.32 (C–18 methyl), 7.88 (C–21 methyl), 6.15 (C–3 methoxyl) 3.05 to 3.45 (unresolved multiplet, 3 aromatic hydrogens). The M.P. and rotation accord with the literature values for this compound (see J. Amer. Chem. Soc. 1951, 73, 1523).

EXAMPLE 7

(a) 17$\alpha$-hydroxy - 3 - methoxy-1-methyl-19-norpregna-1,3,5(10),9(11)-tetraen-20-one.—17$\alpha$ - hydroxypregna-1,4,9(11)-trien-3,20-dione (10.67 g.) in methanol (500 ml.) and redistilled triethylorthoformate (70 ml.) was treated with sulphuric acid (0.5 ml.) in methanol (10 ml.) and the solution was stirred at room temperature for 3 hr. The deep red solution was poured into sodium carbonate solution (0.5 N; 11), concentrated, and extracted with ether. The ethereal solution was washed with water, dried (MgSO$_4$) and the solvent evaporated to give a pale yellow gum. Chromatography on alumina followed by crystallisation from ethanol gave 17$\alpha$-hydroxy-3-methoxy-1-methyl-19-norpregna-1,3,5(10),9(11) - tetraen - 20 - one (7.87 g., 71%) M.P. 130–131°, $[\alpha]_D$ +96°, (C. 0.368; CHCl$_3$), $\lambda$ max. 253 nm. ($\epsilon$ 16,600), $^1$H N.M.R. signals at $\tau$ 9.19 (C$_{18}$-methyl), 7.72 (C$_{21}$-methyl), 7.64 (C$_1$-methyl), 6.25 (C$_3$-methoxy), 4.38 (C$_{11}$-olefinic proton), 3.50–3.18 (multiplet, two aromatic protons).

(b) 17$\alpha$-hydroxy-3-methoxy - 1 - methyl-19-norpregna-1,3,5(10) - trien - 20 - one.—17$\alpha$-hydroxy-3-methoxy-1-methyl-19-norpregna-1,3,5(10),9(11)-tetraen - 20 - one (10 g.) and 10% palladium on charcoal (2 g.) in ethyl acetate (230 ml.) were shaken with hydrogen at room temperature and pressure until hydrogen uptake ceased. The catalyst was filtered off, the volume of solvent reduced and the product allowed to crystallise to give 17$\alpha$-hydroxy-3-methoxy-1-methyl - 19 - norpregna-1,3,5(10)-trien-20-one (6.39 g., 80%) M.P. 184–185°; $[\alpha]_D$ +118° (C. 0.46; CHCl$_3$); $\lambda$ max. 280 nm. ($\epsilon$ 1,650), 287 nm. ($\epsilon$ 1,680), $^1$H N.M.R. signals at $\tau$ 9.20 (C$_{18}$-methyl), 7.72 and 7.66 (C$_1$ and C$_{21}$-methylene), 6.23 (C$_3$-methoxy), 3.41 and 3.49 (C$_2$ and C$_4$ aromatic protons).

(c) 17$\alpha$-acetoxy - 3 - methoxy-1-methyl-19-norpregna-1,3,5(10)-trien-20-one.—A solution of 17$\alpha$ - hydroxy-3-methoxy-1-mehtyl-19-norpregna-1,3,5(10)-trien - 20 - one (2 g.) and toluene-p-sulphonic acid (1 g.) in acetic anhydride (16 ml.) and acetic acid (40 ml.) was stirred at room temperature for 1 hr. Water (200 ml.) was added and the precipitated steroid was filtered off, washed with water, and crystallised from ether to give 17$\alpha$-acetoxy-3-methoxy-1-methyl-19-norpregna - 1,3,5(10) - trien-20-one (1.48 g.; 66%) M.P. 153–154°, $[\alpha]_D$ +110°, (C. 0.96; CHCl$_3$), $\lambda$ max. 280 nm. ($\epsilon$ 1,650), 287 ($\epsilon$ 1,750); $^1$H N.M.R. signals at $\tau$ 9.29 (C–18 methyl), 7.93+7.85 (C$_{21}$ and C$_{17}$-acetate-methyls), 7.63 (C$_1$-methyl), 6.24 (C$_3$-methoxy), 3.5 (multiplet-2-aromatic protons).

(d) Ceric ammonium nitrate oxidation of 17$\alpha$-acetoxy-3 - methoxy - 1-methyl-19-norpregna-1,3,5(10)-trien-20-one.—The above compound (0.50 g.) in acetic acid (40 ml.) was treated over 30 min. with a solution of ceric ammonium nitrate (2.85 g.) in acetic acid (10 ml.) and water (20 ml.). The solution was stirred at room temperature for 8 hr. Water (200 ml.) was added and the steroids were extracted into ethyl acetate. The organic solution was washed with sodium carbonate solution, then water, dried ($MgSO_4$) and the solvent was evaporated to leave a pale yellow solid (0.385 g.). Chromatography of this material on a thick silica gel layer, developed with petroleum-ether: acetone (3:1) afforded two major fractions.

The less polar fraction, representing 58% of the product contained 17α-acetoxy-1-formyl-3-methoxy-19-norpregna-1,3,5(10)-trien-20-one (ca. 65% from N.M.R. integrated signals). $^1$H N.M.R. peaks at τ 9.24 ($C_{18}$-methyl), 7.97, 7.84 ($C_{21}$-methyl, 17α-acetate), 6.24 ($C_3$-methoxy) and −0.50 ($C_1$-formyl proton). γ max. 2700, 1710, 1700, 1595, 1250, 860 cm.$^{-1}$. The impurity in this fraction and the main constituent of the more polar fraction (ca. 38% of the total product) was 17α-acetoxy-1-carboxy-3-methoxy-19-norpregna-1,3,5(10)-trien-20-one $^1$H N.M.R. peaks at τ 9.34 ($C_{18}$-methyl), 7.96, 7.91 ($C_{21}$-methyl, 17α-acetate), 6.26 ($C_3$-methoxy). γ max. 3450 (broad band), 1730, 1705, 1660, 1595, 1250, 890 cm.$^{-1}$.

EXAMPLE 8

Ceric perchlorate oxidation of 17α-acetoxy-3-methoxy-1-methyl-19-norpregna-1,3,5(10)-trien-20-one 17α-acetoxy-3-methoxy-1-methyl-19-norpregna-1,3,5(10)-trien-20-one (0.106 g.) in acetic acid (10 ml.) was treated over 1 hr. with a solution (0.4 N) of ceric perchlorate in N perchloric acid (4 ml.). The dark red solution was stirred at room temperature for 3 hr. Water was added and the steroids were extracted into ethyl acetate. The organic solution was washed with sodium carbonate solution, then water, dried, and the solvent evaporated to give a yellow solid (0.101 g.). The major component (ca. 70%) of this product had identical $R_f$ to that of 17α-acetoxy-1-formyl-3-methoxy-19-norpregna-1,3,5(10)-trien-20-one. ($R_f$=0.18 on silica gel, developed with petroleum ether 3:1).

We claim:

1. A process for preparing an aromatic formyl steroid of the general formula wherein
R is CHO or lower alkoxy,
$R^1$ is hydrogen or lower alkoxy,
$R^2$ is hydrogen or —CHO, and
$R^3$ is an oxo group; or (a) hydrogen, hydroxy, or acyloxy, together with (b) hydrogen, acyl, alkyl, alkenyl or alkynyl; provided that when R is —CHO, $R^1$ is lower alkoxy and $R^2$ is hydrogen and when R is lower alkoxy, $R^1$ is hydrogen and $R^2$ is —CHO, which comprises oxidizing with a 1-electron transfer oxidizing agent a steroid of the general formula wherein
$R^1$ and $R^3$ are as defined above,
$R^4$ is $CH_3$ or lower alkoxy, and
$R^5$ is hydrogen or $CH_3$, provided that when $R^4$ is $CH_3$, $R^1$ is lower alkoxy and $R^5$ is hydrogen, and when $R^4$ is lower alkoxy, $R^1$ is hydrogen and $R^5$ is $CH_3$.

2. A process as claimed in claim 1 wherein the oxidising agent is selected from the group consisting of a ceric salt, an argentic salt and argentic oxide.

3. A process as claimed in claim 2 wherein the oxidising agent is selected from the group consisting of a ceric ammonium salt, ceric perchlorate and argentic picolinate.

4. A process as claimed in claim 3 wherein the ceric ammonium salt is ceric ammonium nitrate.

5. A process as claimed in claim 1 wherein oxidation is effected with a ceric salt under acidic conditions.

6. A process as claimed in claim 1 wherein oxidation is effected for up to 10 hours.

7. A process as claimed in claim 1 in which the aromatic formyl steroid compound initially produced is decarbonylated by a noble metal decarbonylating agent.

8. A process as claimed in claim 7 wherein the decarbonylating agent is selected from the group consisting of metallic palladium and rhodium decarbonylating agent.

9. A process as claimed in claim 8 wherein the rhodium decarbonylating agent comprises a tris(triphenylphosphine)-rhodium salt.

10. A process as claimed in claim 9 wherein the salt is tris-(triphenylphosphine)-rhodium chloride.

11. A process for the preparation of a steriod of the general formula wherein
$R^1$ is hydrogen or lower alkoxy,
$R^3$ is an oxo group; or (a) hydrogen, hydroxy, or acyloxy, together with (b) hydrogen, acyl, alkyl, alkenyl or alkynyl;
$R^6$ is —$CO_2H$ or lower alkoxy, and
$R^7$ is hydrogen or $CO_2H$, provided that when $R^6$ is $CO_2H$, $R^1$ is lower alkoxy and $R^7$ is hydrogen, and when $R^6$ is lower alkoxy, $R^1$ is hydrogen and $R^7$ is $CO_2H$, which comprises oxidizing the corresponding aromatic formyl steroid as defined in claim 1 having a formyl group in either the 1- or 4-positions in ring-A.

12. A steroid of the general formula wherein
R is —CHO or lower alkoxy,
$R^1$ is hydrogen or lower alkoxy, $R^2$ is hydrogen or —CHO, and
$R^3$ is $CH_3$
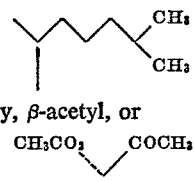
keto, β-acetoxy, β-acetyl, or
provided that when R is —CHO, $R^1$ is lower alkoxy and $R^2$ is hydrogen, and when R is lower alkoxy, $R^1$ is hydrogen and $R^2$ is —CHO.
References Cited
UNITED STATES PATENTS
3,483,235  12/1969  Jeger et al. _____ 260—397.4
3,494,918  2/1970  De Ruggieri et al. __ 260—397.4
ELBERT L. ROBERTS, Primary Examiner
U.S. Cl. X.R.
260—239, 55 A, 397.1, 397.4, 397.45, 397.5